United States Patent [19]
Freytag et al.

[11] Patent Number: 5,398,075
[45] Date of Patent: Mar. 14, 1995

[54] ANALOG CHROMA KEYING ON COLOR DATA

[75] Inventors: Lawrence K. Freytag; Bill A. Munson, both of Portland, Oreg.

[73] Assignee: Intel Corporation, Santa Clara, Calif.

[21] Appl. No.: 154,955

[22] Filed: Nov. 19, 1993

[51] Int. Cl.$^6$ .............................................. H04N 9/75
[52] U.S. Cl. .................................. 348/590; 348/591; 348/592; 348/587
[58] Field of Search ............... 348/586, 587, 588, 589, 348/590, 591, 592, 593, 598, 599, 600; H04N 9/74, 9/75

[56] References Cited

U.S. PATENT DOCUMENTS 3,764,732  10/1973  Macheboeuf ........................ 348/592
4,908,700   3/1990  Ishii et al. ............................. 348/587

*Primary Examiner*—James J. Groody
*Assistant Examiner*—Michael H. Lee
*Attorney, Agent, or Firm*—Blakely, Sokoloff, Taylor & Zafman

[57] ABSTRACT

A circuit for analog chroma keying on color data permits display of graphics, generated from a computer system, and video on an output display. The analog chroma keying circuit receives the graphics signals and the video signals, wherein the graphics signals include color data to designate a color key. The analog chroma keying circuit includes a plurality of digital to analog converters that generate a plurality of color key limits for defining a range to detect the color data denoting the color key. The analog chroma keying circuit also includes a plurality of comparators coupled to receive the graphics signals and the color key limits for each primary color. The plurality of comparators generate a key on indicator when the graphics signals fall within the color key limits. The key on indicator is input to a plurality of analog switches that couples the graphics signals to the output display when the key on indicator indicates the graphics signals are not within the color key limits, and couples the video signals to the output display when the graphics signals are within the color key limits.

21 Claims, 6 Drawing Sheets

ANALOG CHROMA KEYING ON COLOR DATA

FIELD OF THE INVENTION

The present invention relates to the field of displaying images on a computer output display, and more particularly, to methods and apparatus for analog chroma keying on color data.

BACKGROUND OF THE INVENTION

Computer systems perform a variety of functions including data acquisition, data processing and display of graphical images. The ability to integrate different external sources under control of a central processing unit generates a variety of applications for computer systems. For example, computers find applications in telecommunications where the display monitor provides a graphical display for input messages to an operator, and a user interface provides a means for the operator to generate output messages. In addition, computer systems are utilized for multi-media productions. In general, multi-media productions require integration of several audio and video production units to provide a single controllable unit. Multi-media projects cover many communication media types, including printed materials, audio programs, television shows, feature films and many others. Such computer system applications often require a single output monitor to display video data generated by an external source, and graphical data generated by the computer system.

As illustrated in the above examples, a computer system, configured to integrate computer graphics and external video, requires combining the video data and the graphics data on a single display monitor. In general, graphics adapters in computer systems that contain separate frame buffers for graphics data and video data may combine data in either the digital or analog domain. Although VESA connectors on graphics adapters permit merging graphics data streams with video data streams, VESA connectors exhibit physical limitations requiring 640×480×8 bpp output displays. In order to merge graphics data streams and video data streams for larger displays (e.g. 1024×768), operation in the analog domain is required.

Prior art methods for merging graphics data streams and video data streams in the analog domain require three 2:1 analog multiplexors, one for each primary color (e.g. red, green and blue). Typically, the three analog multiplexors are controlled by chroma keying logic that selects one of the two inputs based on detection of a color key. The color key is set to a black color defined by zero or a very low voltage on the analog red, green and blue signal lines. However, the use of a black key may cause undesirable side effects or artifacts when the computer system operates in a windows system environment. For example, if a drop down menu partially obscures or overlays a video window, any graphics pixels in the black chroma key color range are not displayed because the video window is selected in lieu of display of the black graphics. Consequently, the video shows through the black text in the menu. Typically, menus utilize black text, thereby rendering black a poor choice for the color key. Consequently, it is desirable to provide an analog chroma keying system that does not rely solely on black as the color key.

SUMMARY AND OBJECTS OF THE INVENTION

Therefore, it is an object of the present invention to provide an analog chroma keying system that does not solely utilize a black color key.

It is a further object of the present invention to provide an analog chroma keying system that permits selection of the color key.

These and other objects are realized in the analog chroma keying system of the present invention. An analog chroma keying circuit is utilized to display graphics and video on an output display. The graphics signals are generated from a computer system, and the video signals are generated from a video subsystem. The analog chroma keying circuit receives the graphics signals and the video signals, wherein the graphics signals include color data to designate a color key. The analog chroma keying circuit includes a plurality of digital to analog converters (DACs). The DACs generate a plurality of color key limits for defining a range to detect the color key. The analog chroma keying circuit also includes a plurality of comparators coupled to receive the graphics signals and the color key limits for each primary color. The plurality of comparators generate a "key on" indicator when the graphics signals fall within the color key limits.

The key on indicator is input to a plurality of analog switches. The analog switches include a first analog switch, that receives the graphics signals, and a second analog switch that receives the video signals. The first and second analog switches are coupled to the output display such that, the first analog switch couples the graphics signals to the output display when the key on indicator indicates the graphics signals are not within the color key limits, and the second analog switch couples the video signals to the output display when the graphics signals are within the color key limits.

The analog chroma keying circuit of the present invention is implemented in a computer system. The computer system contains a central processing unit, memory and an I/O bus for coupling a plurality of I/O peripheral devices to the computer system. The computer system includes a graphics subsystem for displaying graphics on an output display, and a video subsystem for generating video signals. The graphics signals and video signals are input to the analog chroma keying circuit. The analog chroma keying circuit detects the color key in the graphics signal, and couples the graphics signals to the output display when the analog chroma keying circuit does not detect the color key in the graphics signal. Alternatively, the analog chroma keying circuit couples the video signals to the output display when the analog chroma keying circuit detects the color key in the graphics signal. The computer system permits selection of color data for the color key. The DACs in the analog chroma keying circuit receive data and control information from the CPU to generate the color key limits for the color key selected.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Methods and apparatus for an analog chroma keying system are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

The analog chroma keying system of the present invention permits selection of color data to designate a color key. In general, a user of the computer system is permitted to select from a variety of pre-configured color key selections. The apparatus of the present invention permits configuration of any color key as is described more fully below. For example, a computer system may provide a selection of bright magenta, black, dark red, and bright green color keys to a user. By providing a selection of a variety of color keys, a user of the computer system may select the color key most appropriate for the application. For example, for a particular application program, a user of the computer system may generate graphics menus comprising text and background for display in conjunction with video windows. Depending upon the color selection for the text and the background, the user of the computer system selects color data for a color key to optimize display of the graphics menus and the video window. In operation, if a drop down menu partially obscures or overlays a video window, the proper selection of a color key eliminates bleed through of the video window onto the graphics pixels.

The analog chroma keying system of the present invention is described via a computer system storing pixels in a frame buffer. In computer graphics systems, pixels are stored as digitized data in frame buffers for display on a monitor. Generally, the pixels are stored as a digitized value representing a red, green and blue (RGB) pixel index. The RGB pixel index value does not directly define a color but requires transformation to a RGB color definition before display on the monitor. In order to convert the RGB pixel index to the RGB color definition, a color map or a color table is required. The RGB pixel index value provides an entry to the color map to generate the corresponding RGB color definition. The RGB pixel index requires less memory storage than the RGB color definition, and consequently, storage of RGB color index pixels in lieu of the RGB color definition in the frame buffer reduces cost and increases overall graphics response time since fewer bits are manipulated per pixel. For example, a RGB color definition may comprise 24 bits wherein 8 bits defines each of the three primary colors. In addition to reducing memory requirements in the frame buffer, the color map provides color correction including gamma correction and color map animation.

Figure 1:
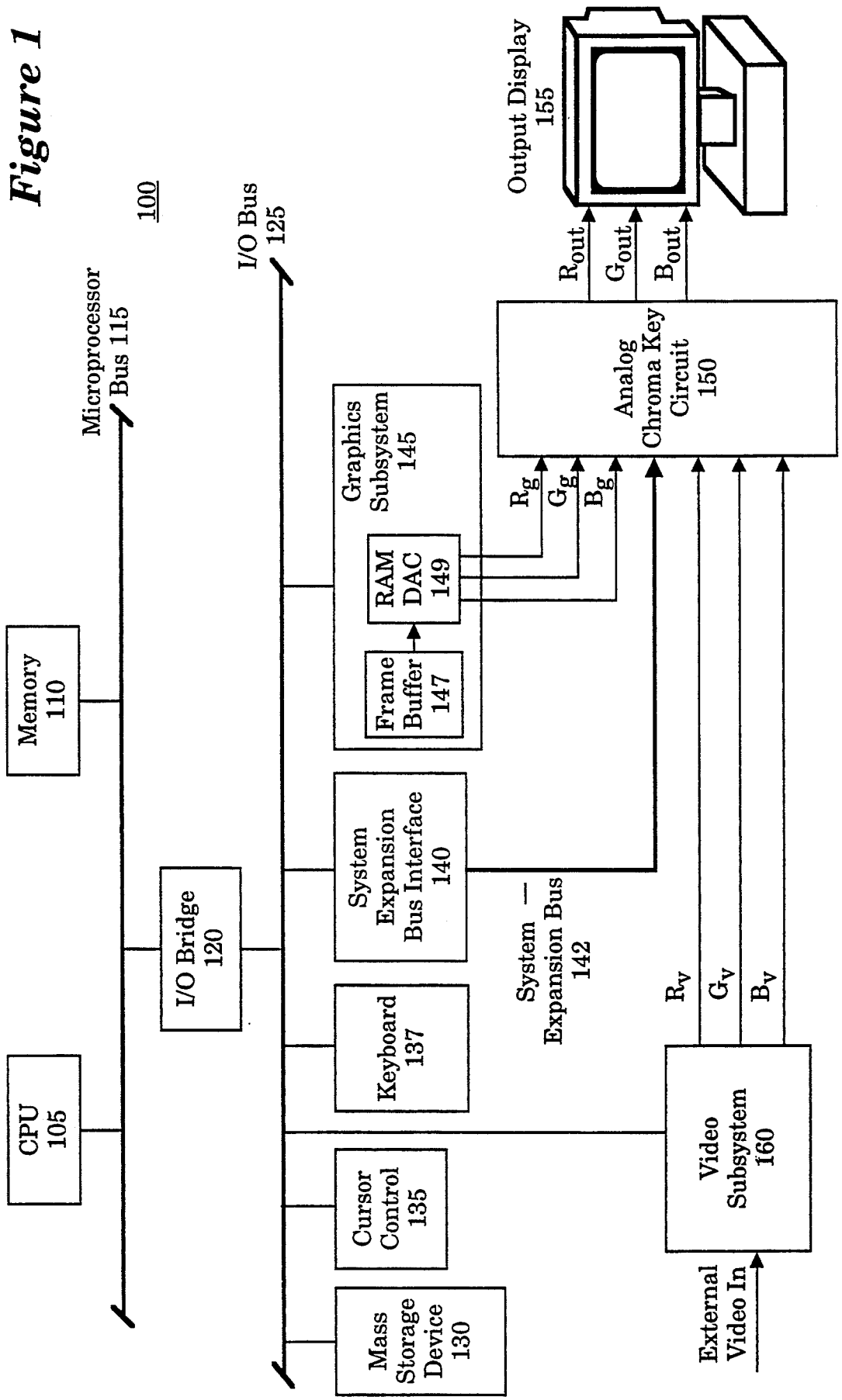
FIG. 1 illustrates a high level diagram of a computer system incorporating the analog chroma keying system of the present invention.

Referring to FIG. 1, a high level diagram of a computer system incorporating the analog chroma keying system of the present invention is illustrated. A computer system 100 contains a central processing unit (CPU) 105 and a memory 110, coupled via a microprocessor bus 115. The computer system 100 also contains an input/output (I/O) bus 125. A mass storage device 130, cursor control device 135, and keyboard device 137, are coupled to the I/O bus 125. The mass storage device 130, cursor control device 135, and keyboard device 137, are those I/O devices typically found contained within a computer system, and these devices are intended to represent a broad category of I/O peripheral devices, which are well known in the art and will not be described further. The microprocessor bus 115 is coupled to the I/O bus 125 via an I/O bridge 120. The I/O bridge 120 provides functionality to allow the CPU 105 to interface to the I/O devices contained on the I/O bus 125. For example, the I/O bridge 120 may comprise an I/O bus arbiter and an I/O bus controller. The CPU 105, memory 110, microprocessor bus 115, I/O bridge 120, and I/O bus 125 are intended to represent a broad category of data processing devices which are well known in the art and will not be described further.

In order to implement the analog chroma keying system of the present invention, the computer system 100 contains a system expansion bus interface 140 and a graphics subsystem 145. In addition, the computer system 100 contains an analog chroma key circuit 150 coupled to an output display 155. In general, the system expansion bus interface 140 provides an interface to a system expansion bus 142. The system expansion bus 142 permits the CPU 105 to transfer data and control information to the analog chroma key circuit 150. The graphics subsystem 145 contains hardware required to drive the output display 155. In one embodiment, the graphics subsystem 145 contains a frame buffer 147 coupled to a random access memory and digital to analog converter (RAM DAC) 149. The frame buffer 147 may be implemented on a video random access memory (VRAM). The RAM DAC 149 both converts pixel data to the appropriate format and generates analog graphics signals to drive the output display 155. In a preferred embodiment, the graphics subsystem 145 generates a red (Rg), green (Gg), and blue (Bg) analog graphics signals for input to the analog chroma key circuit 150. The analog graphics signals, Rg, Gg, and Bg, comprise a voltage range from 0 volts to 0.72 volts.

The computer system 100 also contains a video subsystem 160. In a preferred embodiment, the video subsystem 160 is configured to support teleconferencing applications for the computer system 100. In general, the video subsystem 160 generates analog video signals comprising a video red ($R_v$), video green ($G_v$), and video blue ($B_v$) analog signals. In order to generate the analog video signals, the video subsystem 160 receives video source data. In a first embodiment, the video subsystem 160 is coupled to a network so as to receive raw video source data. The video subsystem 160 compresses the video source data into a format suitable for storage in a source file contained within the computer system 100. In a preferred embodiment, the source file contains color pixels in the luminance/chrominance or YUV format which is derived from broadcast television standards. Beyond the YUV format, additional color gamuts or formats may be utilized for additional applications. When display of video is desired on the output display 155, the video subsystem 160 retrieves the source file and decompresses the video source data. In addition, the video subsystem 160 converts the YUV format pixels to RGB color definition via a mathematical transformation to generate the $R_v$, $G_v$, and $B_v$ analog video signals. In a second embodiment, the video subsystem 160 directly receives external video data, and generates the $R_v$, $G_v$, and $B_v$ analog signals by converting the input video data into the analog RGB color definition domain.

In addition to receiving the RGB analog graphics signals, the analog chroma key circuit 150 receives the $R_v$, $G_v$, and $B_v$ analog signals. In general, the analog chroma key circuit 150 selects either the Rg, Gg and Bg signals from the graphics subsystem 145 or the $R_v$, $G_v$, and $B_v$ signals from the video source. The selection is based on the detection of the color key encoded on the Rg, Gg and Bg signals. The analog chroma key circuit 150 generates a red out ($R_{out}$), green out ($G_{out}$) and blue out ($B_{out}$). The $R_{out}$, $G_{out}$ and $B_{out}$ signals drive the output display 155. The analog chroma key circuit 150 permits display of graphics data, generated by the computer system 100, and video data, generated by the video subsystem 160, on a single output display 155.

The analog chroma keying system of the present invention requires encoding color data, representing the color key, on the Rg, Gg and Bg signals. For example, the encoding of the Rg, Gg and Bg signals may be accomplished via a program operating in conjunction with a windows program to designate areas of the output display for graphics and video. For the area of the output display screen designated for a video window, the program encodes the color data representing the color key. For the areas of the output display screen designated for graphics, the program generates the appropriate pixel data. The color data, representing the video windows, and the pixel data, representing the graphics area, are stored in the frame buffer 147 for subsequent retrieval and generation of the Rg, Gg and Bg signals.

Figure 2:
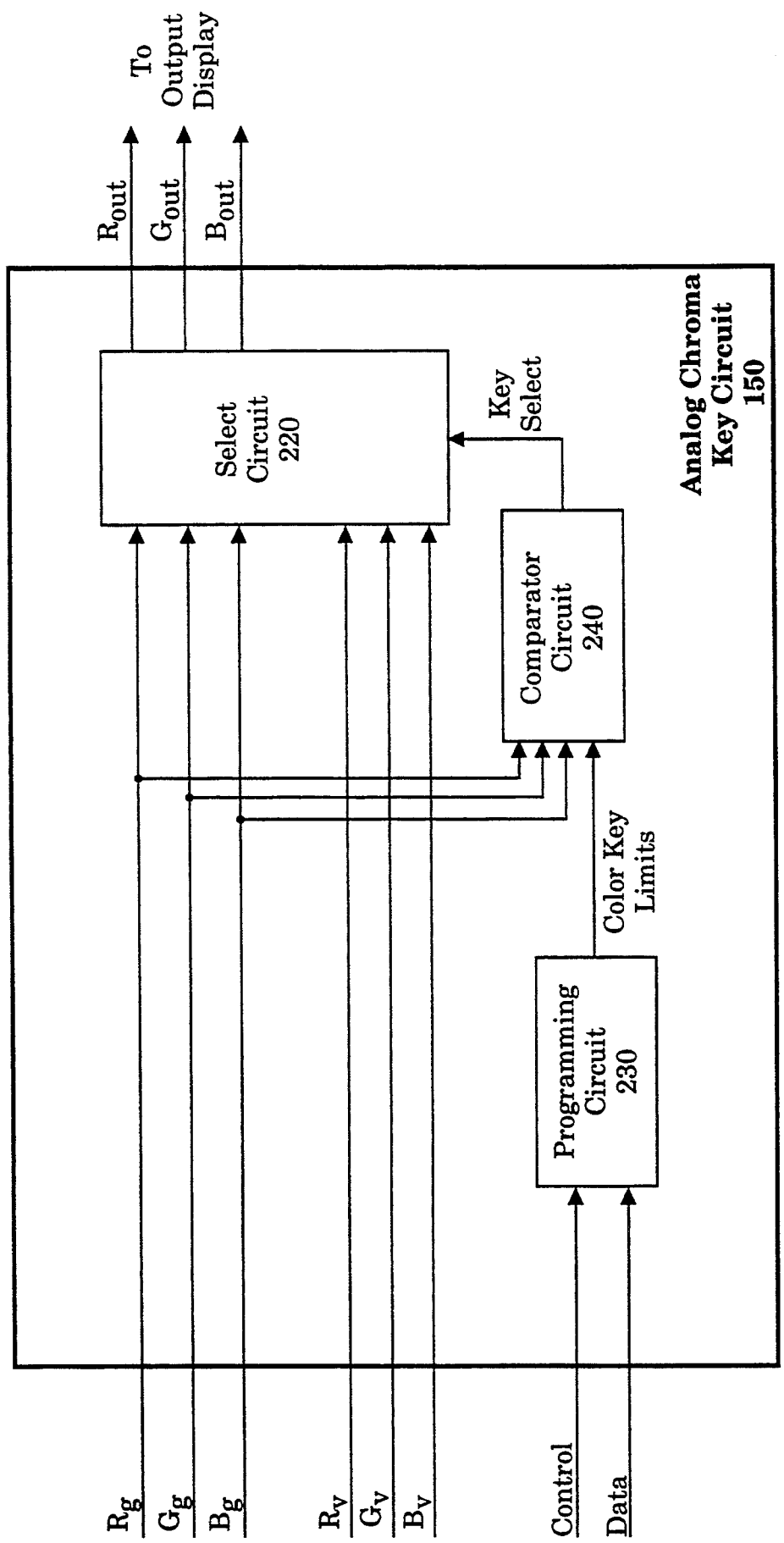
FIG. 2 illustrates a block diagram of the analog chroma key circuit configured in accordance with the present invention.

Referring to FIG. 2, a block diagram of the analog chroma key circuit 150 of the present invention is illustrated. The analog chroma key circuit 150 contains a programming circuit 230, a comparator circuit 240 and a select circuit 220. The programming circuit 230 receives as inputs control and data information, and generates color key limits as outputs. The color key limits define parameters of the color key that controls switching from the graphics signals to the video signals. In one embodiment of the present invention, each primary color contains two color key limits. A first color key limit defines the upper limit for the primary color, and the second color key limit defines the lower limit for the primary color. Consequently, for the preferred embodiment, a red upper limit, red lower limit, green upper limit, green lower limit, blue upper limit, and blue lower limit are generated.

As shown in FIG. 2, the color key limits are input to the comparator circuit 240. In turn, the comparator circuit 240 generates a key select for the select circuit 220. In one embodiment, the key select comprises a "Key On" and "Key Off" signals. In addition to the key color limits, the Rg, Gg, and Bg signals are input to the comparator circuit 240. In general, the comparator circuit 240 compares each graphics signal with the corresponding color key limits. If each graphics signal falls within the color key limits for the corresponding primary color, then the comparator circuit 240 generates the "Key On" signal. Alternatively, if any of the graphics signals are not in the color key limits for the corresponding primary color, then the comparator circuit 240 generates the "Key Off" signal. The select circuit 220 contained within the analog chroma key circuit 150, receives as inputs Rg, Gg, Bg, $R_v$, $G_v$, and $B_v$. In general, the select circuit 220 provides a multiplexing function such that if the comparator circuit 240 generates a "Key On" signal, then the select circuit 220 selects $R_v$, $G_v$ and $B_v$ as $R_{out}$, $G_{out}$, and $B_{out}$, respectively. Alternatively, if the comparator circuit 240 generates a "Key Off" signal, then the select circuit 220 selects Rg, Gg and Bg as $R_{out}$, $G_{out}$, and $B_{out}$, respectively.

The analog chroma keying system of the present invention permits selection of a color key. The apparatus of the present invention generates any color key. Referring to Table 1, color key examples for bright magenta, black, dark blue, and bright green are shown. Table 1 shows the voltage values for the color key limits for bright magenta, black, dark blue, and bright green key colors. For example, to generate a dark blue key color, the upper red color key limit is set to 0.1 volts, the lower red color key limit is set to 0.0 volts, the upper green color key limit is set to 0.1 volts, the lower green color key limit is set to 0.0 volts, the upper blue color key limit is set to 0.3 volts, and the lower blue color key limit is set to 0.1 volts. As discussed above, the key color is detected when the Rg signal falls between the upper red limit and the lower red limit, the Gg signal falls between the upper green limit and the lower green limit, and the Bg signal falls between the upper blue limit and the lower blue limit. For the bright green color key example, the color key is detected when the Rg signal is between 0.1 volts and 0.0 volts, the Gg signal is greater than 0.5 v, and the Bg signal is less than 0.1 volts.

TABLE 1

| Key Color | Red upper limit | Red lower limit | Green upper limit | Green lower limit | Blue upper limit | Blue lower limit |
|---|---|---|---|---|---|---|
| Bright Magenta | full scale | 0.5 v | 0.1 v | 0 v | full scale | 0.5 v |
| Black | 0.1 v | 0 v | 0.1 v | 0 v | 0.1 v | 0 v |
| Dark Blue | 0.1 v | 0.0 v | 0.1 v | 0 v | 0.3 v | 0.1 v |
| Bright Green | 0.1 v | 0 v | full scale | 0.5 v | 0.1 v | 0 v |

When a color key requires only detection of a graphics signal lower than a specified limit, then the upper color key limit for the corresponding color is programmed to the specified limit, and the lower color key limit is programmed to a zero value so that the lower color key limit comparison always yields a true condition. In addition, when a color key requires only detection of a graphics signal greater than a specified limit, then the lower color key limit is programmed to the specified limit, and the upper limit value is programmed to greater than full scale value so that the upper limit comparison always yields a true condition. The color keys illustrated in Table 1 are exemplary, and additional color keys may be generated in accordance with the analog chroma keying system of the present invention.

In order to implement the analog chroma keying system of the present invention in a computer system, a program for configuring the programming circuit 230 resides in the memory 110. In one embodiment, the program contains a user interface that permits the user of the computer system to select from a variety of color keys. For example, the program may comprise a configuration routine wherein a list of color keys available for selection are displayed on the output display. Once the user selects a color key, the color key information is saved so that the user need only update the color key information when selection of a new color key is desired. Upon initial power up of the computer system, the program is executed such that the CPU 105 transfers data, corresponding to the color key selected, and control information to the programming circuit 230 via the system expansion bus 142.

Figure 3:
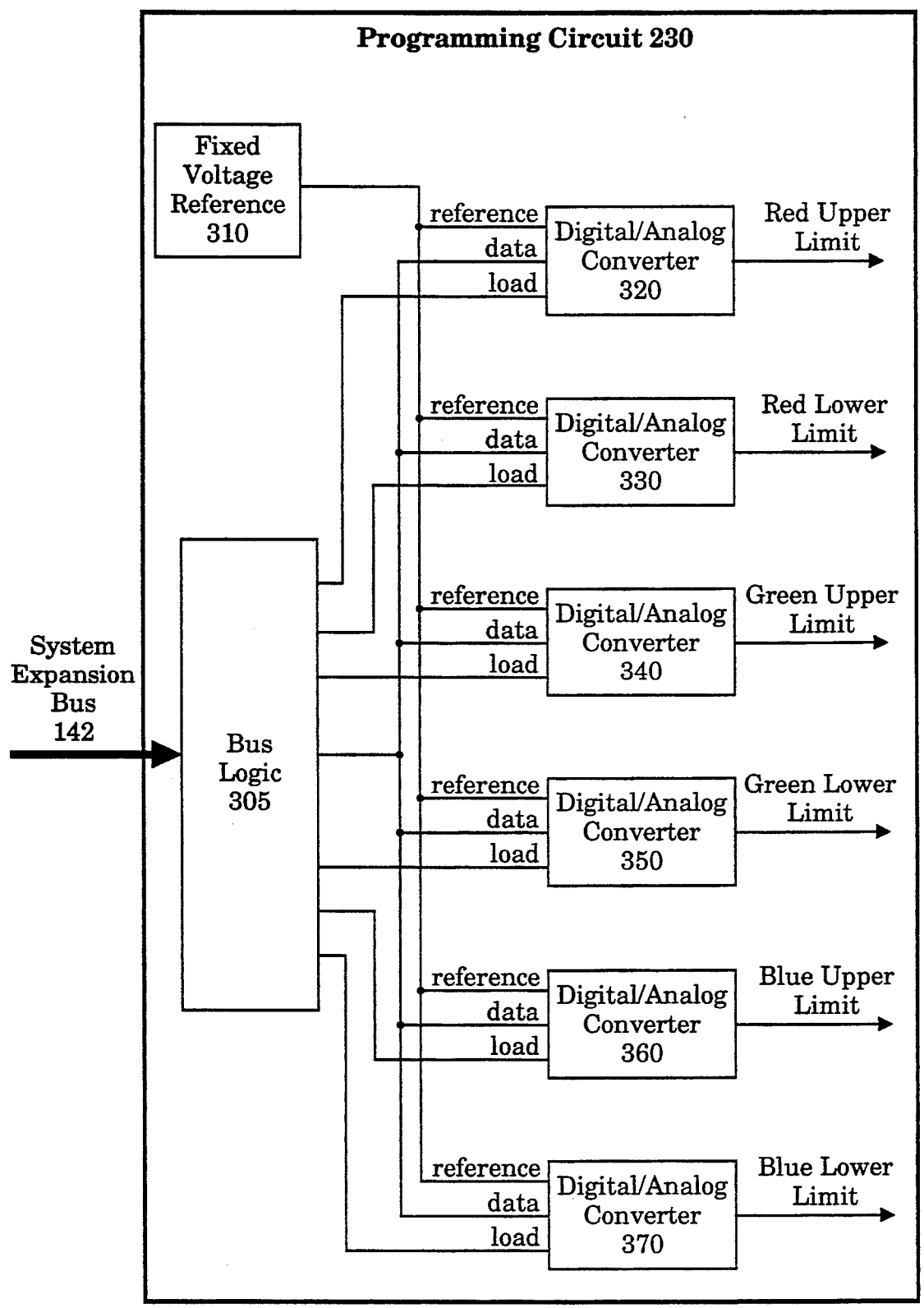
FIG. 3 illustrates one embodiment for a programming circuit for configuring the color key.

Referring to FIG. 3, one embodiment for the programming circuit 230 for configuring the color key in accordance with the present invention is illustrated. The programming circuit 230 contains a plurality of digital to analog converters (DACs) 320, 330, 340, 350, 360 and 370. In addition, the programming circuit 230 contains a fixed voltage reference 310. The fixed voltage reference 310 inputs a voltage signal to each DAC to provide a scale for the digital to analog conversion. In the preferred embodiment, the scale ranges from 0 volts to 0.72 volts corresponding to the full range of the RGB signals. The system expansion bus 142 is coupled to a bus logic circuit 305. The bus logic circuit 305 operates in accordance with the bus protocol for the system expansion bus. In operation, the CPU 105 transmits data and control information to the programming circuit 230 via the system expansion bus 142.

The bus logic circuit 305 receives the data and control information from the CPU 105 and loads a value into each DAC corresponding to the data. In general, the bus logic circuit 305 latches the data, generates the appropriate load strobes for each DAC, and loads the data into the appropriate DAC. For example, to set an upper limit for red utilizing a bright magenta key color, the CPU 105 transmits data and control information, via the system expansion bus 142 to the bus logic 305. For the bright magenta key color, the upper red limit corresponds to a value greater than the DAC full scale. In addition, the bus logic 305 selects the DAC 320, based on the control information, and generates the load strobe to load the full scale value into DAC 320. Similarly, to generate the lower red limit for the bright magenta color key, the CPU 105 transmits, via the system expansion bus 142, to the bus interface 305 a digital value representing 0.5 volts, and the appropriate control information to load the value into DAC 330. The operation of the bus logic, such as bus logic 305, to load data from a bus to a register in a device, such as a DAC, is well known in the art and will not be described further.

Figure 4:
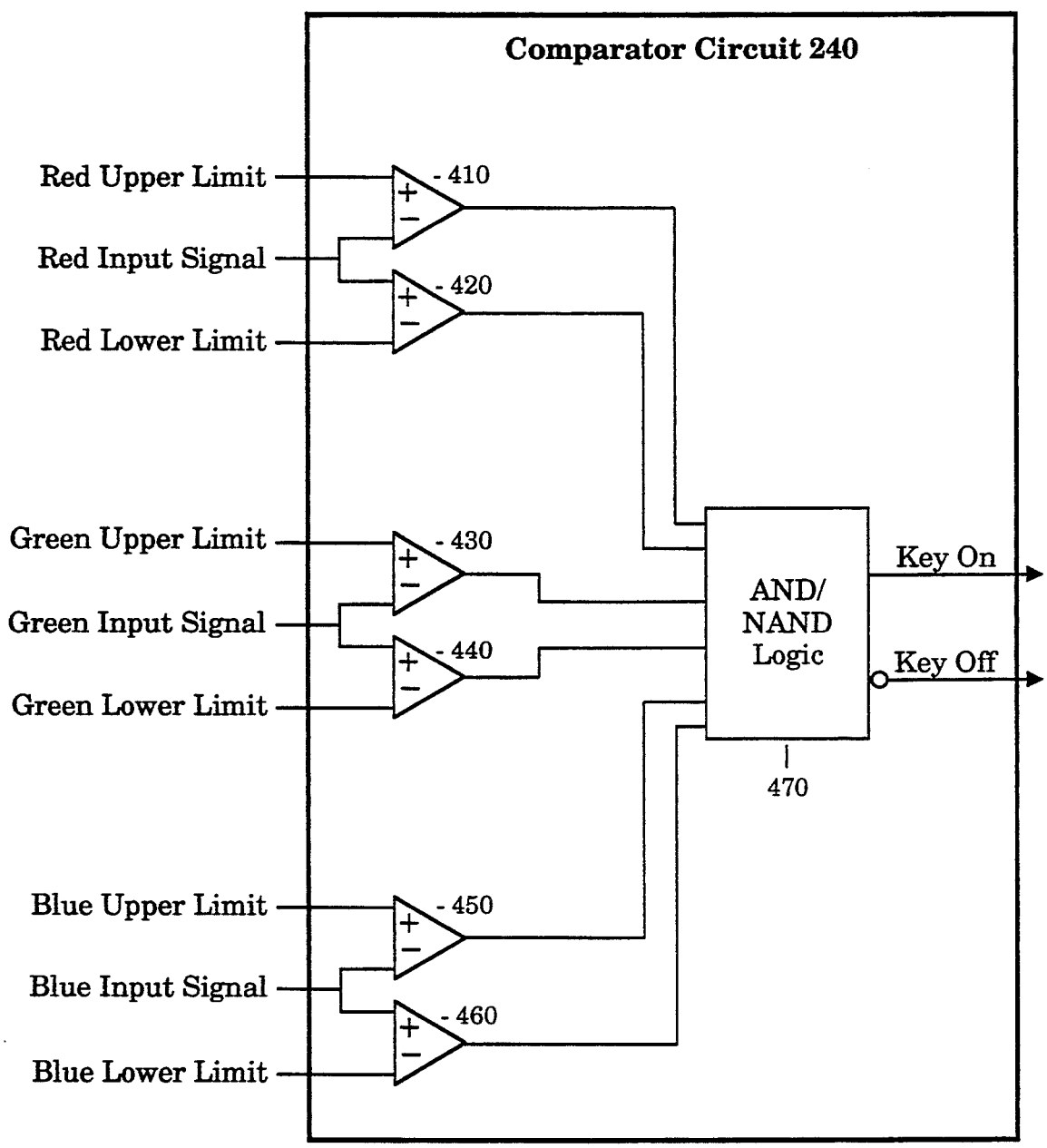
FIG. 4 illustrates one embodiment for a comparator circuit for detecting the color key.

Referring to FIG. 4, a comparator circuit for use in operation with the analog chroma keying system of the present invention is illustrated. The comparator circuit 240 contains six voltage comparators, wherein each primary color contains a first voltage comparator (410, 430 and 450) and a second voltage comparator (420, 440 and 460). Each of the first voltage comparators (410, 430 and 450) receives an upper limit signal at a positive terminal input, and a graphics signal at a negative terminal input. If the upper limit signal is greater than the graphics signal, then the first voltage comparator generates a true condition or a high logic level signal. Alternatively, if the graphics signal is greater than the upper limit signal, then the first voltage comparator generates a not true condition or a low logic level. Each of the second voltage comparators (420, 440 and 460) receives a lower limit signal at a negative terminal input, and a graphics signal at a positive terminal input. If the lower limit signal is less than the graphics signal, then the second voltage comparator generates a true condition or a high logic level signal. Alternatively, if the graphics signal is less than the lower limit signal, then the second voltage comparator generates a not true condition or a low logic level.

The output of each first and second voltage comparator is coupled to AND/NAND gate logic 470. The AND/NAND gate logic 470 generates the "key on" and "key off" signals. In general, the AND/NAND gate 470 provides a logical AND and a logical NAND functions. The output from each voltage comparator is input to both AND and NAND functions. If all comparators generate a true condition, or a high logic level, then the AND/NAND logic 470 generates an active "key on" signal. Alternatively, if any of the first and second voltage comparators generate a not true condition, or a low logic level, then the AND/NAND logic 470 generates an active "key off" signal.

Figure 5:
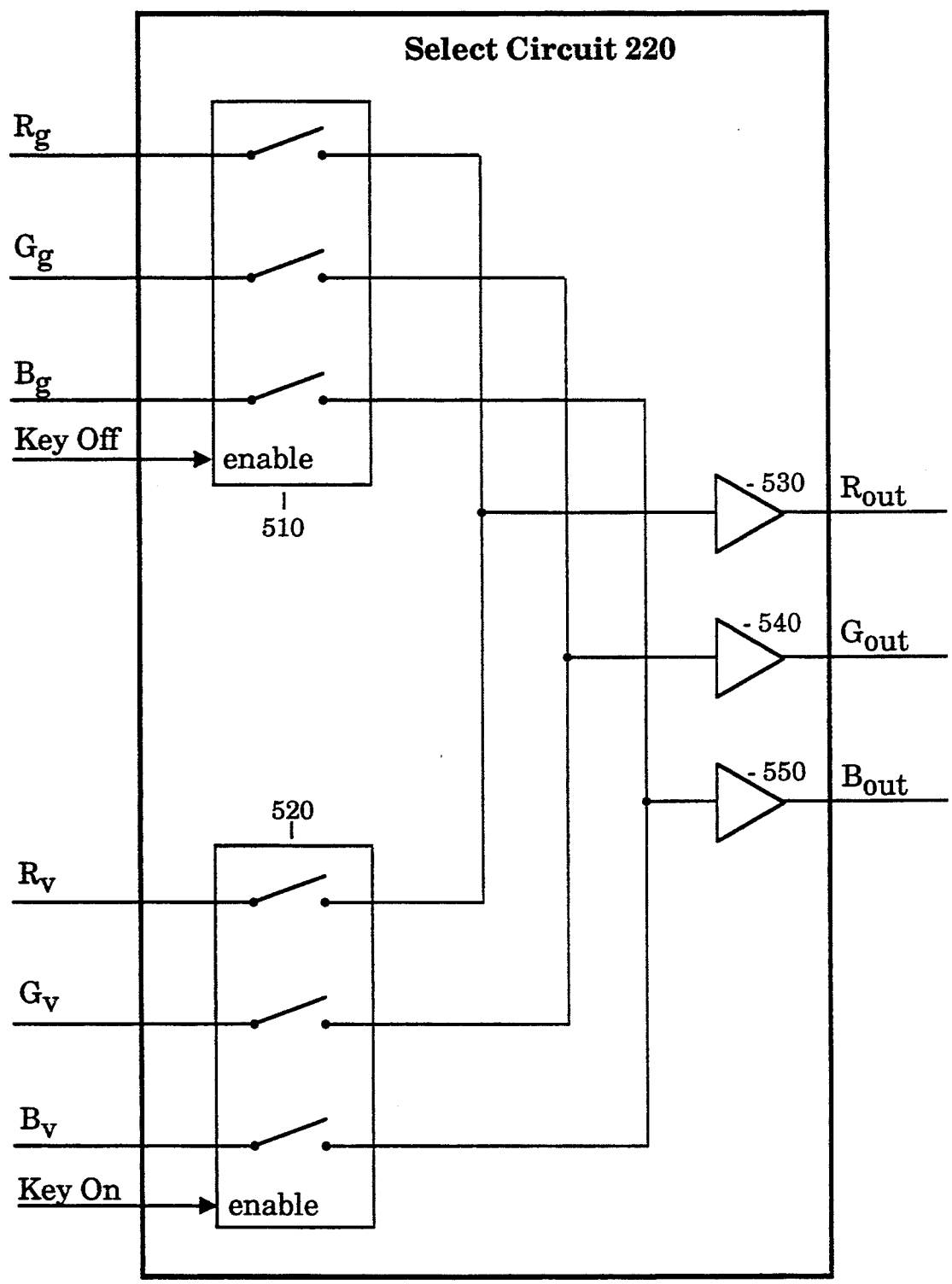
FIG. 5 illustrates one embodiment for a select circuit for selecting between video signals and graphics signals.

Referring to FIG. 5, a select circuit 220 configured in accordance with a preferred embodiment of the present invention is illustrated. The select circuit 220 contains two analog switches 510 and 520. The analog switch 510 receives $R_g$, $G_g$, and $B_g$ as inputs, and the analog switch 520 receives $R_v$, $G_v$, and $B_v$ as inputs. The analog switch 510 is controlled by the key off signal, and the analog switch 520 is controlled by the key on signal. A first output on analog switch 510 is coupled to a first output on analog switch 520 for selection of the $R_{out}$ signal. In order to provide proper drive to the output display 155, a line buffer 530 buffers the $R_{out}$ signal. A second output on analog switch 510 is coupled to a second output on analog switch 520 for selection of the $G_{out}$ signal. The $G_{out}$ signal is buffered by a line buffer 540. A third output on analog switch 510 is coupled to a third output on analog switch 520 for selection of the $B_{out}$ signal. The $B_{out}$ signal is buffered by a line buffer 550. In operation, when the key on signal is active, signifying selection of the video signals, then analog switch 520 provides the output to $R_{out}$, $G_{out}$ and $B_{out}$. Alternatively, when the key off is the active signal, then the outputs from analog switch 510 provide the $R_{out}$, $G_{out}$ and $B_{out}$ signals.

Figure 6:
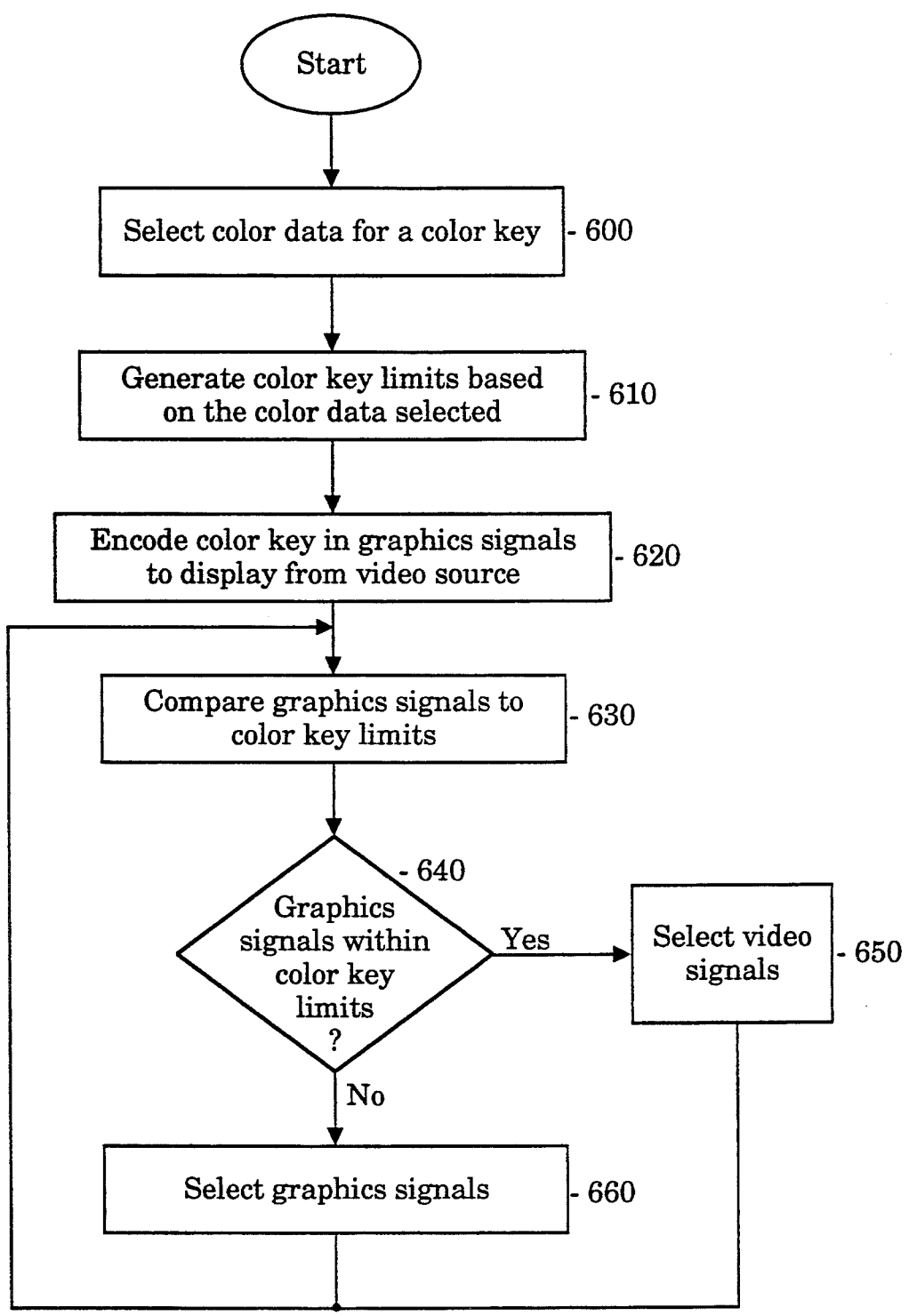
FIG. 6 illustrates a flow diagram for the analog chroma keying method of the present invention.

Referring to FIG. 6, a flow diagram for the analog chroma keying method of the present invention is illustrated. In block 600, a color key is selected. Based on the color key selected, the color key limits are generated as shown in block 610. As described above, the color key limits comprise six signals, two for each primary color. In order to display both computer data and video source data, the computer encodes the color key in portions of the frame buffer for which display of the video source data is desired as shown in block 620. The analog graphics signals are compared with the color key limits as shown in block 630. If the graphics signals are within the color key limits, then the video signals are selected as shown in decision block 640 and block 650. Alternatively, if the graphics colors are not within the color key limits, then the graphics signals are selected as shown in decision block 640 and block 660. During a period for operation of the program, the graphics signals are continuously compared with the color key limits.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for analog chroma keying on color data computer system comprising a high resolution output display, said method comprising the steps of:
    generating, in a frame buffer of said computer system, a plurality of pixel indexes, said pixel indexes including said color data to designate a color key;
    converting said pixel indexes to a color definitions;
    converting said color definition to analog graphics signals;
    receiving said analog graphics signals and video signals;
    generating analog color key limits for said color key, said color key limits defining a range for each primary color in said graphics signals defining said color key;
    comparing said analog graphics signals for each primary color with said analog color key limits to determine whether said analog graphics signals fall within said analog color key limits;
    selecting said analog graphics signals for display on an output display when said analog graphics signals are not within said analog color key limits; and
    selecting said video signals for display on said output display when said graphics signals are within said color key limits.

2. The method for analog chroma keying on color data as set forth in claim 1, further comprising the step of selecting said color data to denote said color key.

3. The method for analog chroma keying on color data as set forth in claim 1, wherein the step of generating color key limits comprises the steps of:
    generating a plurality of first analog voltages to represent an upper limit for each primary color; and
    generating a plurality of second analog voltages to represent a lower limit for each primary color.

4. The method for analog chroma keying on color data as set forth in claim 3, wherein the step of comparing said graphics signals to said color key limits comprises the steps of:
    comparing, for each primary color, said plurality of first voltages representing said upper limit to said graphics signals;
    generating a true condition, for each primary color, when a voltage level of said graphics signal is less than said upper limit;
    comparing, for each primary color, said plurality of second voltages representing said lower limit to said graphics signals;
    generating a true condition, for each primary color, when a voltage level of said graphics signal is greater than said lower limit; and
    generating a select signal when all comparisons yield a true condition, said select signal selecting said video signals for input to said output display.

5. The method for analog chroma keying on color data as set forth in claim 1, wherein said color data designating said color key comprises dark blue.

6. An apparatus for analog chroma keying on color data in a computer system to display graphics and video on a high resolution output display, said apparatus comprising:
    a graphics subsystem including:
        a frame buffer for storing a plurality of pixel indexes, said pixel indexes including said color data to designate a color key;
        a random access memory/digital to analog converter (RAM DAC) coupled to said frame buffer to receive said pixel indexes for converting said pixel indexes to a color definition, and for converting said color definition to analog graphics signals;
    color limit generation means for generating color key limits for said color key, said color key limits defining a range for each primary color defining said color key;
    comparison means, coupled to receive said graphics signals and to said color limits generation means, for comparing said graphics signals for each primary color with said color key limits to determine whether said graphics signals fall within said color key limits; and
    output display selection means, coupled to said comparison means, and coupled to receive said video signals and said graphics signals, said output display comparison means for selecting said graphics signals for display on said output display when said graphics signals are not within said color key limits, and for selecting said video signals for display on said output display when said graphics signals are within said color key limits.

7. The apparatus for analog chroma keying on color data as set forth in claim 6, further comprising color data selection means coupled to said color limit generation means for selecting said color data to denote said color key.

8. The apparatus for analog chroma keying on color data as set forth in claim 6, wherein said color limit generation means comprises analog voltage generation means for generating a plurality of first and second analog voltages, said plurality of first analog voltages representing an upper limit for each primary color, and said plurality of second analog voltages representing a lower limit for each primary color.

9. The apparatus for analog chroma keying on color data as set forth in claim 8, wherein said comparison means comprises:
    a plurality of first comparators for comparing, for each primary color, said plurality of first analog voltages to said graphics signals, said plurality of first comparators generating a true condition, for each primary color, when an analog voltage level of said graphics signal is less than said first analog voltage representing said upper limit; and
    a plurality of second comparators for comparing, for each primary color, said plurality of second analog voltages to said graphics signals, said plurality of second comparators generating a true condition, for each primary color, when an analog voltage level of said graphics signal is greater than said second analog voltage representing said lower limit; and
    select logic, coupled to said plurality of first and second comparators for indicating when all of said plurality of first and second comparators yield a true condition.

10. The apparatus for analog chroma keying on color data as set forth in claim 6, wherein said color data designating said color key comprises dark blue.

11. An apparatus for analog chroma keying on color data in a computer system to display graphics and video on a high resolution output display, said apparatus comprising:
a graphics subsystem including:
a frame buffer for storing a plurality of pixel indexes, said pixel indexes including said color data to designate a color key;
a random access memory/digital to analog converter (RAM DAC) coupled to said frame buffer to receive said pixel indexes for converting said pixel indexes to a color definition, and for converting said color definition to analog graphics signals;
a plurality of digital to analog converters (DACs) for generating a plurality of color key limits for said color key, said plurality of color key limits defining a range for each primary color to define said color key;
a plurality of comparators, coupled to said plurality of DACs to receive said graphics signals and said color key limits for each primary color for generating a key on indicator when said graphics signals fall within said color key limits; and
a plurality of analog switches coupled to said output display and said plurality of comparators, wherein a first analog switch is coupled to receive said graphics signals and a second analog switch is coupled to receive said video signals, said first analog switch being configured to couple said graphics signals to said output display when said key on indicator indicates said graphics signals are not within said color key limits, and said second analog switch being configured to couple said video signals to said output display when said key on indicator indicates said graphics signals are within said color key limits.

12. The apparatus for analog chroma keying on color data as set forth in claim 11, further comprising a graphical user interface including a cursor control device for permitting a user of said computer system to select a color key, and a central processing unit (CPU), said CPU generating control and data information based on said color key selected, and said CPU utilizing said control information to transmit data to said plurality of DACs so as to designate said color key limits.

13. The apparatus for analog chroma keying on color data as set forth in claim 11, wherein said plurality of DACs generate a plurality of first and second analog voltages, said first analog voltages representing an upper limit for each primary color, and said second analog voltages representing a lower limit for each primary color.

14. The apparatus for analog chroma keying on color data as set forth in claim 13, wherein said plurality of comparators comprise:
a plurality of first comparators for comparing, for each primary color, said plurality of first analog voltages to said graphics signals, said plurality of first comparators for generating a true condition, for each primary color, when a voltage level of said graphics signals is less than said first analog voltage representing said upper limit;
a plurality of second comparators for comparing, for each primary color, said plurality of second analog voltages representing said lower limit to said graphics signals, said plurality of second comparators for generating a true condition, for each primary color, when a voltage level of said graphics signal is greater than said second analog voltage representing said lower limit; and
select logic, coupled to said plurality of first and second comparators for generating a select signal when said plurality of first and second comparators yield a true condition.

15. The apparatus for analog chroma keying on color data as set forth in claim 11, wherein said color data designating said color key comprises dark blue.

16. A computer system comprising:
a central processing unit (CPU);
a memory coupled to said CPU;
a graphics subsystem, coupled to said CPU, including:
a frame buffer for storing a plurality of pixel indexes, said pixel indexes including said color data to designate a color key;
a random access memory/digital to analog converter (RAM DAC) coupled to said frame buffer to receive said pixel indexes for converting said pixel indexes to a color definition, and for converting said color definition to analog graphics signals:
a video subsystem for generating video signals;
a high resolution output display for displaying graphics and video; and
an analog chroma keying circuit coupled to said graphics subsystem, said video subsystem, and to said output display, said analog chroma keying circuit being coupled to receive said graphics signals and video signals, and being configured to couple said video signals to said output display when said analog chroma keying circuit detects said color key in said graphics signal, and being configured to couple said graphics signals to said output display when said analog chroma keying circuit does not detect said color key in said graphics signal.

17. The computer system as set forth in claim 16, further comprising a graphical user interface and a cursor control device coupled to said CPU, said graphical user interface permitting a user, via said cursor control device, to select from a plurality of colors for said color key, said CPU generating control and data information, and said CPU utilizing said control information to transmit data to said analog chroma keying circuit so as to detect said color key selected.

18. The computer system as set forth in claim 16, wherein said analog chroma keying circuit comprises:
a plurality of digital to analog converters (DACs) for generating a plurality of color key limits for said color key, said plurality of color key limits defining a range for each primary color to define said color key;
a plurality of comparators, coupled to said plurality of DACs, said plurality of comparators being coupled to receive said graphics signals and said color key limits for each primary color lo and for generating a true condition when said graphics signals fall within said color key limits; and
a plurality of analog switches coupled to said output display and said plurality of comparators, wherein a first analog switch is coupled to receive said graphics signals and a second analog switch is coupled to receive said video signals, said first analog switch being configured to couple said graphics signals to said output display when said graphics signals are not within said color key limits, and said second analog switch being configured to couple said video signals to said output display when said graphics signals are within said color key limits.

19. The computer system as set forth in claim 18, wherein said plurality of DACs generate a plurality of first and second analog voltages, said first analog voltages representing an upper limit for each primary color, and said second analog voltages representing a lower limit for each primary color.

20. The computer system as set forth in claim 19, wherein said plurality of comparators comprise:

a plurality of first comparators for comparing, for each primary color, said plurality of first analog voltages to said graphics signals, said plurality of first comparators for generating a true condition, for each primary color, when a voltage level of said graphics signal is less than said first analog voltage representing said upper limit;

a plurality of second comparators for comparing, for each primary color, said plurality of second analog voltages representing said lower limit to said graphics signals, said plurality of second comparators for generating a true condition, for each primary color, when a voltage level of said graphics signal is greater than said second analog voltage representing said lower limit; and select logic, coupled to said plurality of first and second comparators for generating a select signal when said plurality of first and second comparators yield a true condition.

21. The computer system as set forth in claim 16, wherein said color data designating said color key comprises dark blue.

* * * * *

UNITED STATES PATENT AND TRADEMARK OFFICE
CERTIFICATE OF CORRECTION

PATENT NO. : 5,398,075
DATED : March 14, 1995
INVENTOR(S) : Freytag et al.

It is certified that error appears in the above-identified patent and that said Letters Patent is hereby corrected as shown below:

In column 9 at line 55 delete "signal" and insert --signals--

In column 9 at line 61 delete "signal" and insert --signals--

In column 10 at line 55 delete "signal" and insert --signals--

In column 10 at line 62 delete "signal" and insert --signals--

In column 12 at line 5 delete "signal" and insert --signals--

In column 12 at line 62 delete "lo"

In column 14 at line 2 delete "signal" and insert --signals--

In column 14 at line 10 delete "signal" and insert --signals--

Signed and Sealed this

Twenty-fourth Day of December, 1996

Attest:

BRUCE LEHMAN

*Attesting Officer*          *Commissioner of Patents and Trademarks*